US011030807B2

(12) United States Patent
Watts et al.

(10) Patent No.: US 11,030,807 B2
(45) Date of Patent: Jun. 8, 2021

(54) IMAGE TO ITEM MAPPING

(71) Applicant: Unmade Limited, London (GB)

(72) Inventors: Hal Watts, London (GB); Benjamin Alun-Jones, London (GB); Kirsty Emery, London (GB); Greg Bakker, London (GB)

(73) Assignee: Unmade Ltd.

( * ) Notice: Subject to any disclaimer, the term of this patent is extended or adjusted under 35 U.S.C. 154(b) by 0 days.

(21) Appl. No.: 15/526,629

(22) PCT Filed: Nov. 12, 2015

(86) PCT No.: PCT/EP2015/076485
§ 371 (c)(1),
(2) Date: May 12, 2017

(87) PCT Pub. No.: WO2016/075263
PCT Pub. Date: May 19, 2016

(65) Prior Publication Data
US 2017/0309075 A1    Oct. 26, 2017

(30) Foreign Application Priority Data

Nov. 12, 2014 (GB) ..................... 1420090

(51) Int. Cl.
*G06T 19/00* (2011.01)
*G06T 11/00* (2006.01)

(52) U.S. Cl.
CPC ............ *G06T 19/006* (2013.01); *G06T 11/00* (2013.01); *G06T 11/006* (2013.01);
(Continued)

(58) Field of Classification Search
CPC combination set(s) only.
See application file for complete search history.

(56) References Cited

U.S. PATENT DOCUMENTS 5,619,799 A * 4/1997 Keung-Lung ............ A41H 3/00
33/11
5,680,528 A * 10/1997 Korszun ................. A41H 3/007
345/630
(Continued)

FOREIGN PATENT DOCUMENTS

| JP | 2011-501326 A | 1/2011 |
| KR | 10-2007-0111417 A | 11/2007 |

OTHER PUBLICATIONS

International Patent Application No. PCT/EP2015/076485 International Search Report and Written Opinion dated Feb. 12, 2016 (12 pages).
(Continued)

*Primary Examiner* — Motilewa Good Johnson
(74) *Attorney, Agent, or Firm* — Conley Rose, P.C.

(57) ABSTRACT

There is disclosed a technique for displaying a digital image on a representation of an object, comprising: defining reference point positions on digital image template of a reference item; fitting the reference item to an object; capturing an image of the reference item fitted to the object; mapping positions on a digital image template of a non-reference item to the location positions of the reference points of the captured image to generate a manipulated non-reference digital image; and displaying the manipulated digital image on the reference item fitted to the object.

22 Claims, 11 Drawing Sheets

FITTED REFERENCE ITEM DIGITALLY CAPTURED TO PHOTOGRAPHIC IMAGE TEMPLATE (52) U.S. Cl.
CPC ............... *G06T 2207/10004* (2013.01); *G06T 2207/20221* (2013.01); *G06T 2207/30196* (2013.01); *G06T 2210/16* (2013.01)

(56) References Cited

U.S. PATENT DOCUMENTS

| | | | | |
|---|---|---|---|---|
| 6,307,568 | B1 | 10/2001 | Rom | |
| 6,310,627 | B1* | 10/2001 | Sakaguchi | A41H 3/007 345/630 |
| 6,907,310 | B2* | 6/2005 | Gardner | A41H 1/00 700/132 |
| 6,968,297 | B1* | 11/2005 | Ziakovic | A41H 3/007 345/419 |
| 7,039,486 | B2* | 5/2006 | Wang | A41H 1/00 33/512 |
| 7,657,340 | B2* | 2/2010 | Lind | A41H 3/007 345/419 |
| 7,663,648 | B1* | 2/2010 | Saldanha | G06T 17/00 345/419 |
| 7,752,078 | B2* | 7/2010 | Nakade | G06F 21/31 705/26.1 |
| 7,945,343 | B2* | 5/2011 | Jones | A43B 1/0054 700/97 |
| 7,953,648 | B2* | 5/2011 | Vock | G06Q 10/043 705/27.2 |
| 8,165,711 | B2* | 4/2012 | Brooking | G06F 17/50 700/132 |
| 8,174,521 | B2* | 5/2012 | Harvill | G06T 15/04 345/419 |
| 8,275,590 | B2* | 9/2012 | Szymczyk | G06Q 30/0603 345/418 |
| 9,401,023 | B2* | 7/2016 | Masuko | G06T 3/40 |
| 9,639,635 | B2* | 5/2017 | Wolper | G06T 17/00 |
| 9,702,071 | B2* | 7/2017 | Harvill | D05C 5/04 |
| 10,176,636 | B1* | 1/2019 | Neustein | G06T 7/246 |
| 2004/0153195 | A1* | 8/2004 | Watanabe | A41H 1/10 700/132 |
| 2010/0036753 | A1 | 2/2010 | Harvill et al. | |
| 2011/0298897 | A1* | 12/2011 | Sareen | G06N 3/006 348/47 |
| 2013/0124156 | A1* | 5/2013 | Wolper | G06T 17/00 703/1 |
| 2015/0055085 | A1* | 2/2015 | Fonte | G06Q 30/0621 351/178 |
| 2015/0339853 | A1* | 11/2015 | Wolper | G06T 17/00 345/423 |
| 2016/0180449 | A1* | 6/2016 | Naware | G06Q 30/0643 705/27.2 |

OTHER PUBLICATIONS

Jun Ehara et al., "Texture Overlay onto Deformable Surface for Virtual Clothing," ICAT 2005, Dec. 5-8, Christchurch, New Zealand, pp. 172-179.

Christian Winkler et al., "NaviBeam: Indoor Assistance and Navigation for Shopping Malls through Projector Phones," Retrieved from the Internet: URL:http://www.uni-ulm.de/fileadmin/website_uni_ulm/iui.inst.100/institut/Papers/Prof_Rukzio/2011/2011_winkler_mp2.pdf (retrieved on Jun. 13, 2014), Jan. 1, 2011, pp. 1-5.

Japanese Patent Application No. 2017-525856 Notification of Reasons for Rejection dated Jan. 7, 2020 (15 pages).

Tatsuya Kawahara et al., "Virtual Fitting Room with Spoken Dialogue Interface," Journal of the Information Processing Society of Japan, Japan, Information Processing Society of Japan, May 15, 2998, 39th vol. No. 5, pp. 1267-1274 (10 pages).

Terukatsu Aoki, a virtual tryroom system MIRACLE, an image laboratory, Japan, Nihon Kogyo Publishing Co., Ltd., Feb. 1, 2005, vol. 16, No. 2 (9 pages).

* cited by examiner

IMAGE TO ITEM MAPPING

BACKGROUND TO THE INVENTION

Field of the Invention

The invention relates to the display of a digital image on a representation of an object, and particularly but not exclusively to the display of a digital image representing a design of an item of clothing onto a person.

Description of the Related Art

It is known to provide for the display of digital images onto a representation of an object. For example a digital image of an item of clothing may be displayed onto an image of a person.

A problem associated with displaying images onto representations of objects, such as displaying a digital image of a clothing item onto an image of a person, is to facilitate the display in such a way that the resulting displayed image looks realistic. For example a perfect representation of an image, when displayed on a representation of an object, may need not to be perfect, to reflect the fact that the object "carries" the image in a particular way. For example, for a clothing item, the displayed image needs to reflect the fact that the person is wearing an item and the item is adjusted according to how they are wearing it.

Therefore it is an aim of the invention to provide an improved technique for displaying a digital image on an object.

SUMMARY OF THE INVENTION

A method of displaying a digital image on a representation of an object, comprising: defining reference point positions on a digital image template of a reference item; fitting the reference item to an object; capturing an image of the reference item fitted to the object; mapping positions on a digital image template of a non-reference item to the location positions of the reference points of the captured image to generate a manipulated non-reference digital image; and displaying the manipulated non-reference digital image on the reference item fitted to the object.

The representation of the object may be the captured image of the object, and the manipulated non-reference digital image is displayed on the captured image.

The representation of the object may be the object, and the manipulated non-reference digital image is projected on to the object.

The mapping step may comprise detecting the reference point positions on the captured image and mapping the positions to location points, wherein corresponding points on the digital image template of a non-reference item are mapped to the associated location points to manipulate the non-reference image for display on the representation of the object.

The non-reference digital image may be a catalogue digital image.

Displaying the manipulated digital image on the reference item fitted to the representation of the object may further comprise combining the manipulated digital image with the captured image of the reference item fitted to the object. The manipulated digital image and the captured image may be combined by digitally merging them. When the manipulated digital image and the captured image are combined by digitally merging them, the combined image may be displayed in a virtual reality mirror. When the manipulated digital image and the captured image are combined by digitally merging them, the combined image may be displayed on a computer display.

Displaying the manipulated digital image on the reference item fitted to the object may further comprise projecting the manipulated digital image onto the reference item fitted to the object.

Capturing the image may include capturing information about the reference item. Manipulating the digital image then includes manipulating the digital image in dependence on the captured information about the reference item. Where the reference item is an item of clothing, the captured information may comprise the texture of the item of clothing.

Capturing the image may include capturing information about the fitting of the reference item to the object. Manipulating the digital image may then include manipulating the digital image in dependence on the captured information about the fitting of the reference item to the object. The information may include lighting information. The information may include information of the lighting of the reference item fitted to the object. Where the reference item is an item of clothing the information may comprise lighting information and/or illumination information of the clothing on the object.

Capturing the image may include capturing information about the context of the reference item. Manipulating the digital image then includes manipulating the digital image in dependence on the captured information about the context of the reference item to the object. The information includes luminance information. When the representation of the digital image is displayed the manipulated image is lit appropriately.

The method may comprise capturing a static image of the reference item fitted to the object. The object may be static. Displaying the manipulated digital image on the reference item fitted to the object may comprise displaying the manipulated data image on a static captured image.

The method may comprise capturing a moving image of the reference item fitted to the object. The object may be moving. The image may be adapted in real-time in accordance with the movement of the object. Displaying the manipulated digital image on the reference item fitted to the object may comprise dynamically displaying a dynamically manipulated data image on a moving captured image.

The image may be captured and adapted in real-time, or it may be pre-rendered.

The method may comprise storing a captured image. Displaying the manipulated digital image on the reference item fitted to the object may comprise retrieving a stored captured image and displaying the manipulated captured image on the retrieved stored captured image.

The object may be a person.

The reference item may be an item of clothing. The digital image may be a digital image of an item of clothing. The reference item may be a clothing item of a type corresponding to the type of clothing item of the digital image. For example, a clothing item image comprising three materials may be mapped to a reference item which is made for three materials.

The reference item may be made from two distinct materials such that the two different materials are distinct on a captured image of the reference item. The reference item may be made from materials of distinct colours with the same luminance. The captured image may be re-touched before combining with the displayed image. The reference item may be made from materials having distinct ultra-violet properties. The captured image may not need to be retouched.

A system is configured to provide the method features. The system may be a computer system.

There may be provided computer program code for performing any described method. There may be provided a computer program product for storing computer program code for performing any described method. The computer product may be a disk or memory device, or a hard drive of a computer system. The method may be implemented by computer program code of more than one computing device operating together.

The method may be a computer-implemented method.

DESCRIPTION OF THE PREFERRED EMBODIMENTS

The invention is now described by way of example with reference in particular to the application of a technique for displaying a digital image on a clothing item fitted to a person. The invention is more broadly applicable, as will be apparent to one skilled in the art.

Figure 1:
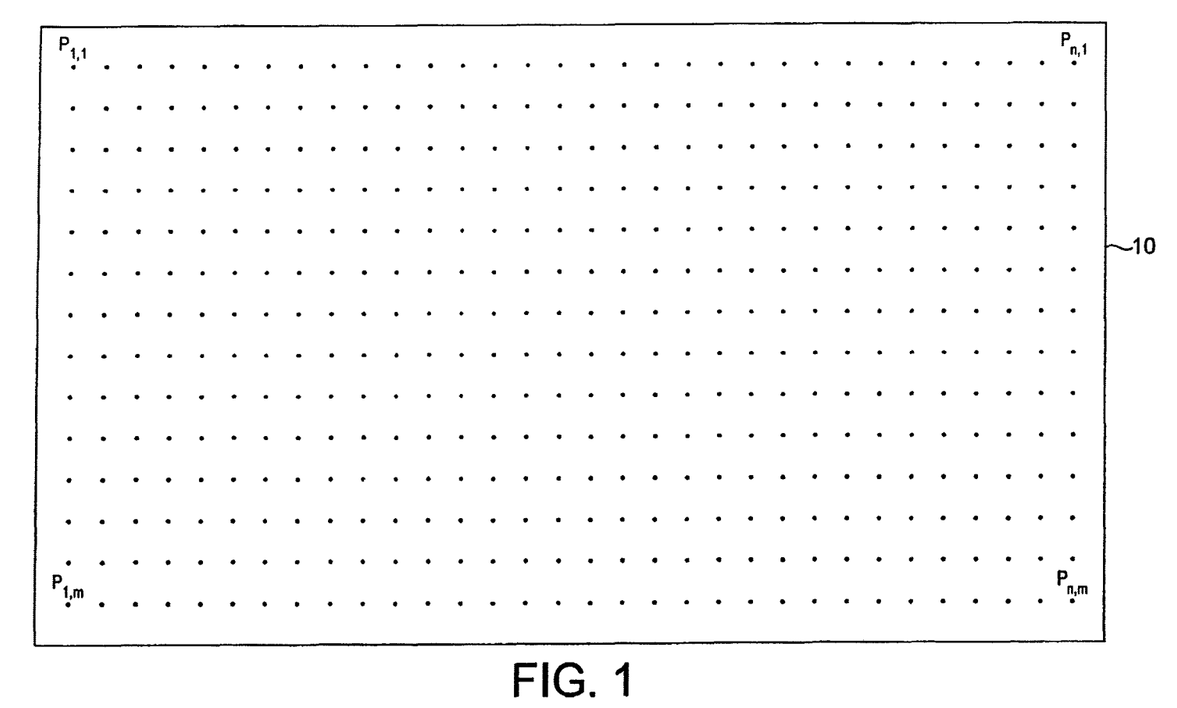
FIG. 1 illustrates a reference matrix for a digital image.

FIG. 1 illustrates a digital image template 10. The digital image template 10 is shown as having an array of pixels, $p_{1,1}$ to $p_{n,m}$. The size of the array of pixels is implementation dependent.

Figure 2:
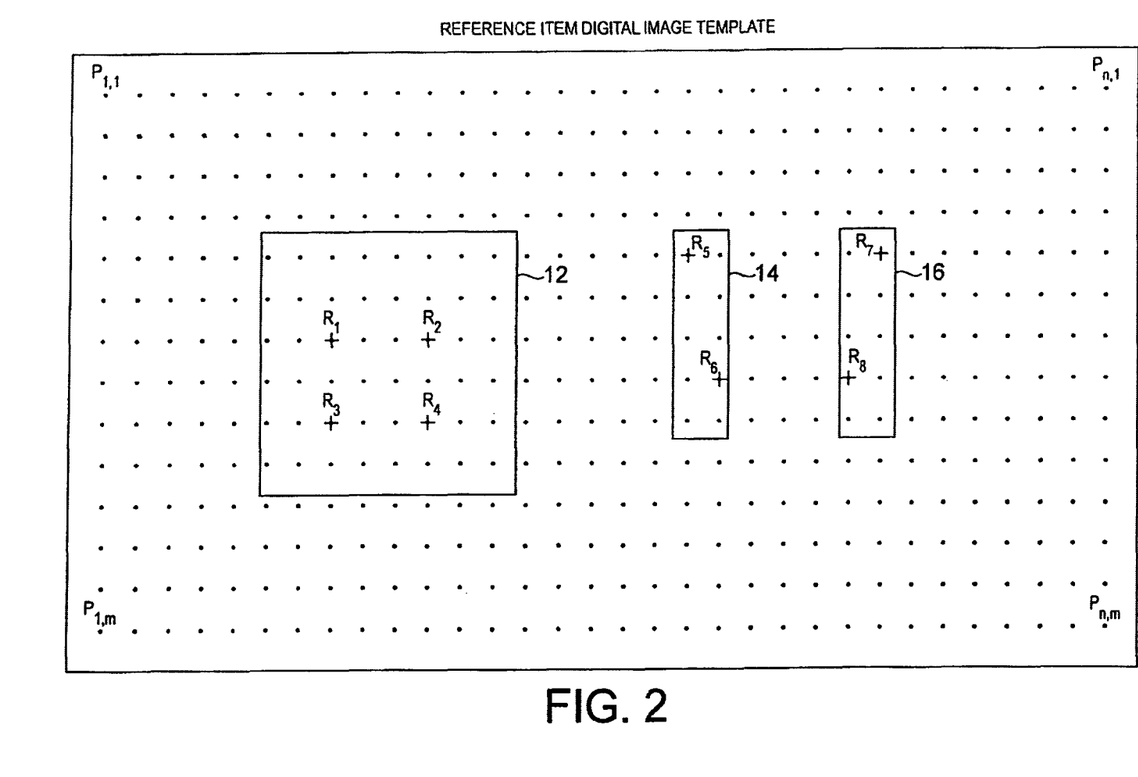
FIG. 2 illustrates a reference item overlaid on the digital image template of FIG. 1.

FIG. 2 illustrates a reference item applied to the digital image template of FIG. 2. In the example described herein, the reference item is an item of clothing. A pattern for the item of clothing is applied to the digital image template. Reference numeral 12 denotes the pattern for a front portion of the item of clothing, and reference numerals 14 and 16 denote the left and right sleeves of the reference item of clothing.

As will be understood with reference to FIG. 2, when the pattern is applied to the digital image template pixels of the array of the template coincide with the patterns. Thus each portion of the pattern is associated with a plurality of pixels. The number of pixels which coincide with the portions of the pattern will depend upon the density of the pixel array.

For the purposes of example, it can be seen that four pixels are coincident with the front of the pattern of the clothing item 12, being denoted as pixels $R_1$, $R_2$, $R_3$ and $R_4$. Two pixels are coincident with the sleeve pattern 14, being denoted as pixels $R_5$ and $R_6$. Two pixels are coincident with a sleeve pattern 16 being denoted $R_7$ and $R_8$.

Figure 3:
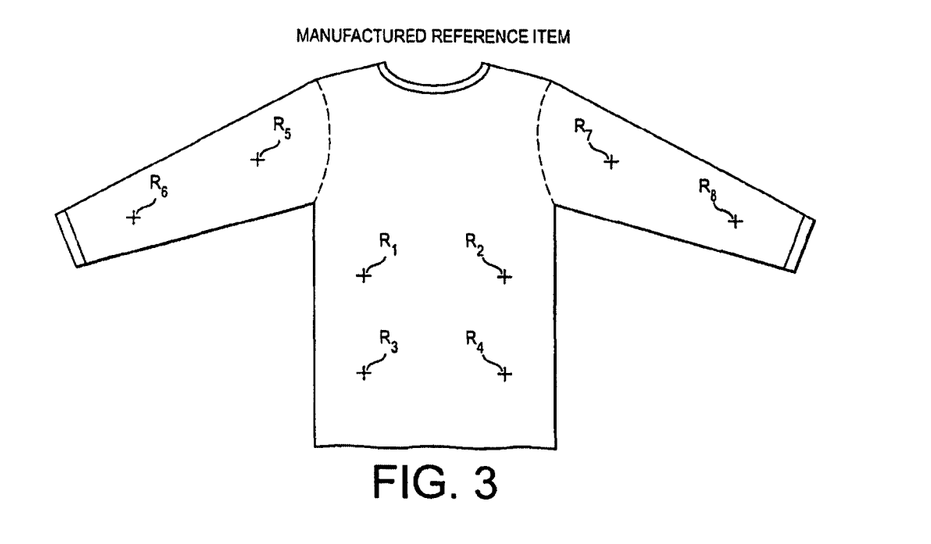
FIG. 3 illustrates a manufactured reference item based on the reference item digital image template of FIG. 2.

In the pattern for the reference item, the reference points $R_1$ to $R_8$ may be specifically identified on the pattern. FIG. 3 illustrates an item of clothing made according to the pattern of FIG. 2, and it can be seen that the reference points $R_1$ to $R_8$ are located on particular points of the item of clothing. Where the pattern is formed of two colours, for example, then the reference points may be illustrated on the item of clothing as shown in FIG. 3 by the use of different coloured materials to produce the item, so that the reference marks physically stand out.

Figure 4:
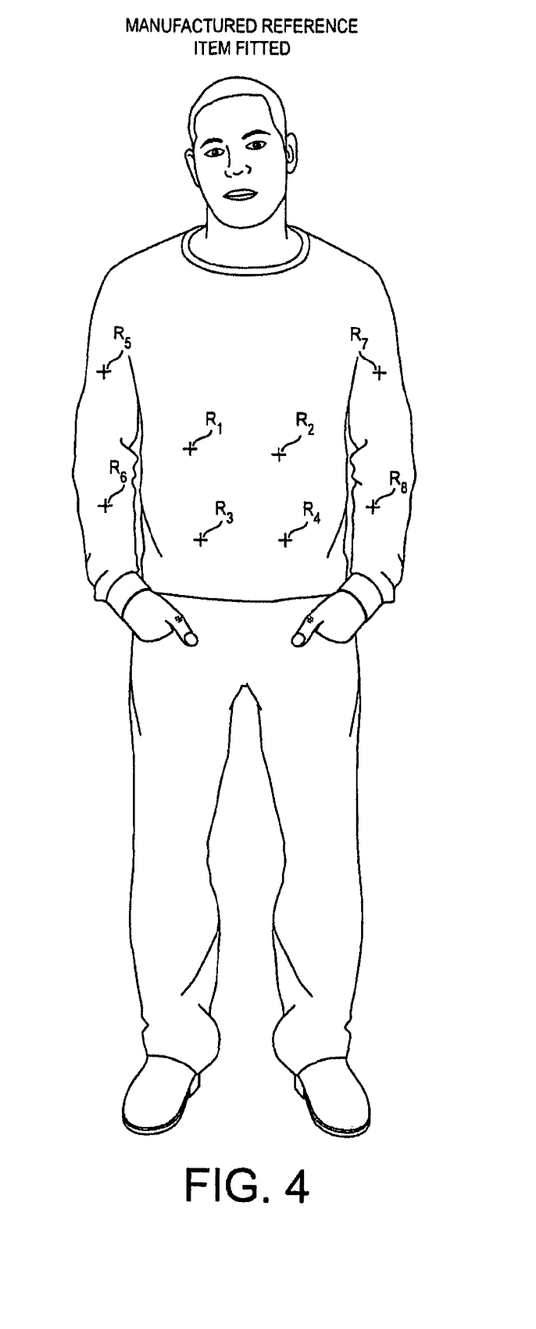
FIG. 4 illustrates the reference item as fitted to a person.

With reference to FIG. 4 there is shown the manufactured reference item of FIG. 3 fitted to a person, the person being an example of an object. As can be seen in FIG. 4, the reference points $R_1$ to $R_8$ are visible on the reference item of clothing.

Figure 5:
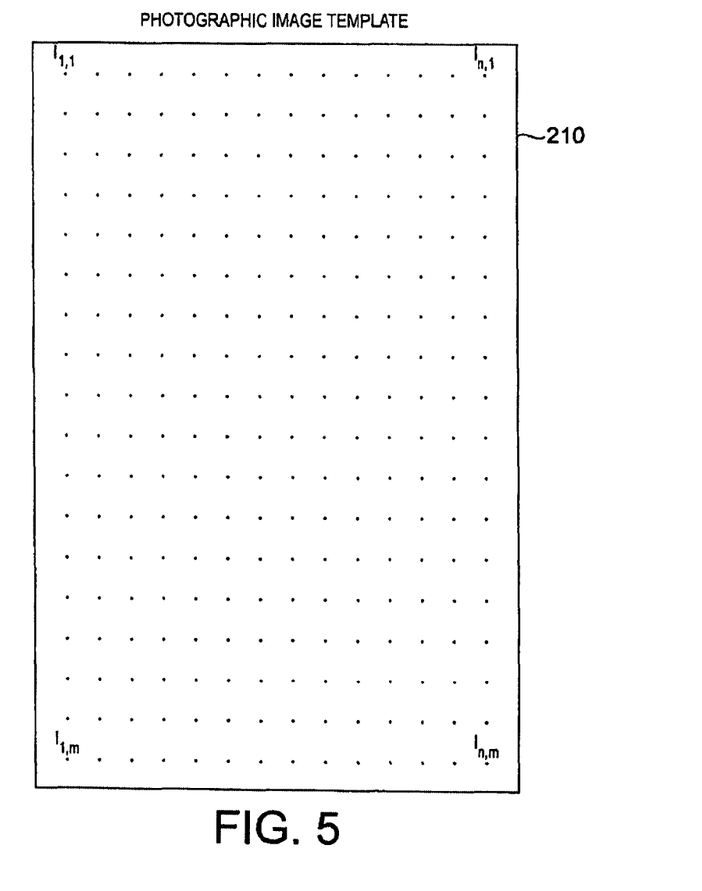
FIG. 5 illustrates a location mapping of a digital photographic image.

With reference to FIG. 5 there is shown a photographic image template denoted by reference numeral 20. An array of pixels is associated with the photographic image template, denoted by $l_{1,1}$ to $l_{n,m}$. The calibration reference for the photographic image template may simply be one corner of the image, such as the top left corner being the pixel $l_{1,1}$ and the bottom right corner being the pixel $l_{n,m}$. The pixel array as shown in FIG. 5 may therefore simply be obtained by providing a set of coordinates to the space of the photographic image.

Figure 6:
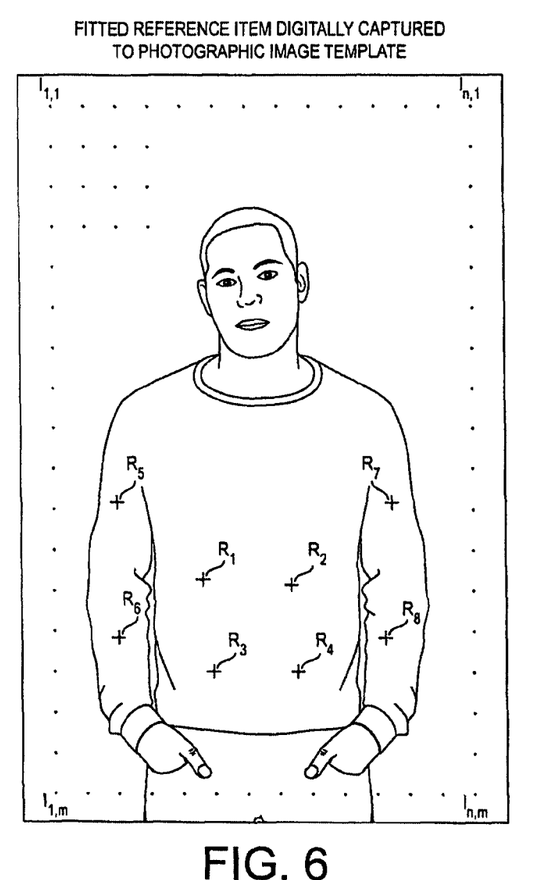
FIG. 6 illustrates an image of the fitted reference item of FIG. 4 applied to a digital image template such as that of FIG. 5.

A photographic image is taken of the manufactured reference item fitted to the object (e.g. person) as shown in FIG. 4, and the resulting photographic image is shown in FIG. 6. FIG. 6 thus shows the fitted reference item digitally captured to a photographic template.

As can be understood with reference to FIG. 5, the resulting image shown in FIG. 6 can be mapped to coordinates of a physical location system defined by pixel elements $l_{1,1}$ to $l_{n,m}$. Thus each of the reference points $R_1$ to $R_8$ may be identified as being located at a physical location of the image being one of the pixels $l_{1,1}$ to $l_{n,m}$.

Thus the reference points may be mapped to locations in space of the photographic digital image, for example as follows:

Point $R_1$ maps to position $l_{a,b}$
Point $R_2$ maps to position $l_{c,d}$
Point $R_3$ maps to position $l_{e,f}$
Point $R_4$ maps to position $l_{g,h}$
Point $R_5$ maps to position $l_{i,j}$
Point $R_6$ maps to position $l_{k,l}$
Point $R_7$ maps to position $l_{o,p}$
Point $R_8$ maps to position $l_{q,r}$ A user may access a catalogue showing various clothing items, which may have different patterns applied to them. A user may then select a pattern from the catalogue.

Figure 7:
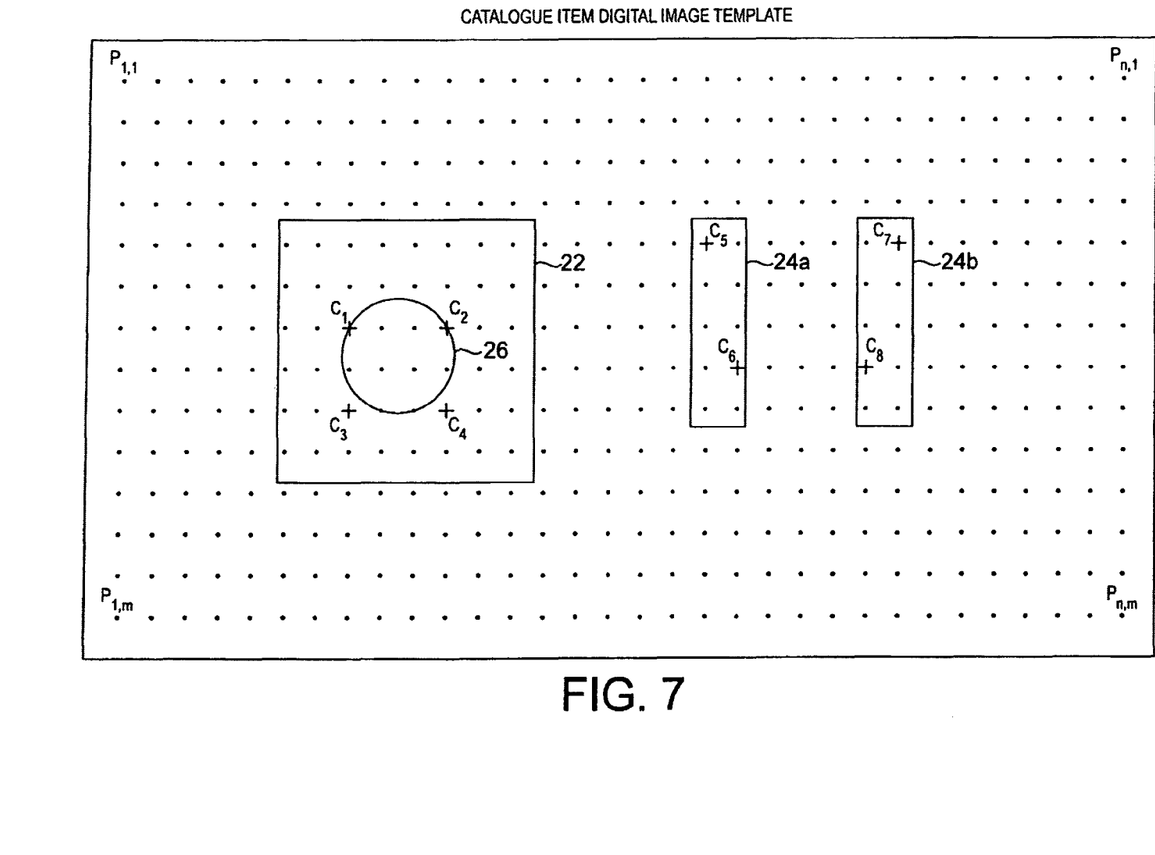
FIG. 7 illustrates a catalogue item presented on a digital image template.

For example FIG. 7 illustrates a digital image template for a particular catalogue item, comprising a front portion 22, and arm portions 24a, 24b. As shown in FIG. 7, a pattern comprising a circle 26 is applied to the front portion 22.

In practice, as a user accesses a catalogue item, they may simply be shown an image representing a pattern, such as an image representing the front portion 22 of the catalogue item with the pattern 26 applied.

The user then may select the catalogue item such as shown in FIG. 7, and the catalogue item is then displayed to the user by applying the digital image template of the catalogue item as shown in FIG. 7 to the digitally captured image of the fitted reference item as shown in FIG. 4.

Figure 8:
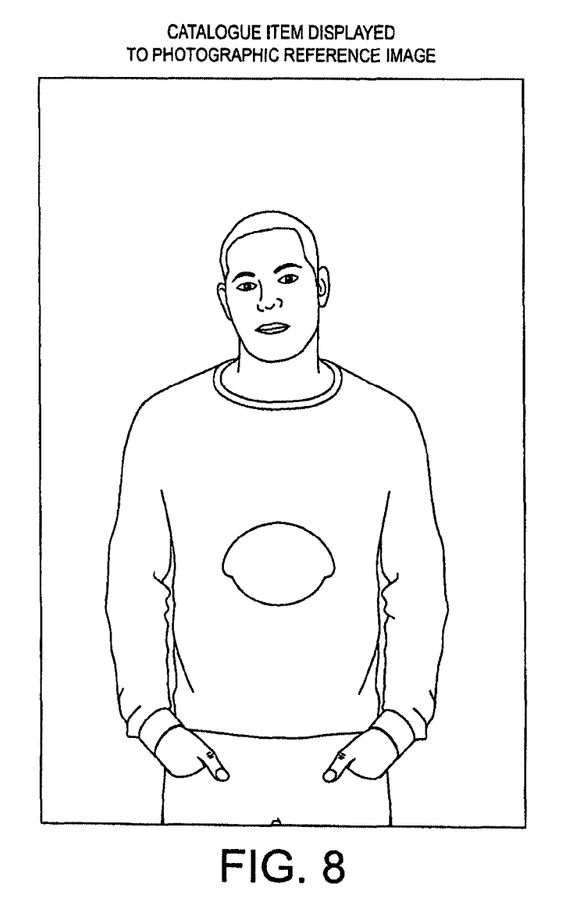
FIG. 8 illustrates the display of the catalogue item on the reference image of FIG. 6.

Thus as shown in FIG. 8, the catalogue item is shown applied to the captured image of a person, but with the pattern 26 suitably adjusted to take into account the wearing of the item by the person, taking into account the location of the reference points of the reference object relevant to the location points of the digital image.

As shown in FIG. 7, the catalogue item is shown on a digital image template and therefore has all the reference points which are associated with the reference item. As shown in FIG. 7, the digital image template of the catalogue item has pixel positions $C_1$ to $C_8$ corresponding to the pixel locations in the reference digital template of points $R_1$ to $R_8$.

Based on the correlation between the reference points $R_1$ to $R_7$ in the location system comprising the location array $l_{1,1}$ to $l_{n,m}$, then the points $C_1$ to $C_8$ on the catalogue item associated with the reference points $R_1$ to $R_8$ can be displayed at the appropriate location points, to take into account the adjustment of the item when it is actually applied to a clothing item worn on a person. The digital image of the catalogue item is thus manipulated.

Figure 9:
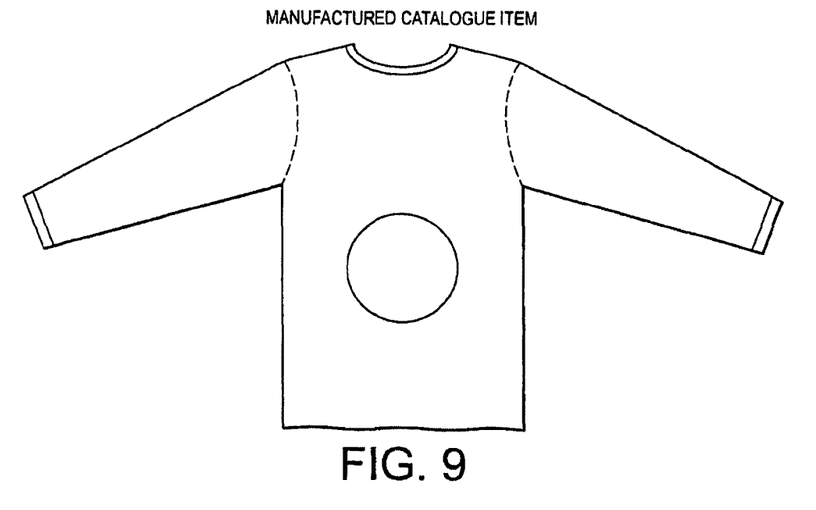
FIG. 9 illustrates the manufactured catalogue item of FIG. 7.

The points of the catalogue item may be mapped to the captured reference item as follows:

Point $C_1$ maps to point $R_1$ which maps to position $l_{a,b}$
Point $C_2$ maps to point $R_2$ which maps to position $l_{c,d}$
Point $C_3$ maps to point $R_3$ which maps to position $l_{e,f}$
Point $C_4$ maps to point $R_4$ which maps to position $l_{g,h}$
Point $C_5$ maps to point $R_5$ which maps to position $l_{i,j}$
Point $C_6$ maps to point $R_6$ which maps to position $l_{k,l}$
Point $C_7$ maps to point $R_7$ which maps to position $l_{o,p}$
Point $C_8$ maps to point $R_8$ which maps to position $l_{q,r}$ With reference to FIG. 9 there is illustrated the manufacture of the catalogue item of FIG. 7, and it can be seen that when a clothing item as illustrated in FIG. 7 is worn on a person the "perfect" representation as shown in FIG. 9 actually results in a representation which is manipulated to take into account the wearing of the garment by the person as shown in FIG. 8.

Thus the pixel points associated with the catalogue item applied to the digital image template as shown in FIG. 7 are mapped to the corresponding reference points when the item is worn as shown in FIG. 4, to allow a realistic representation of the digital image to be displayed as shown in FIG. 8.

A scaling may also be required to scale the manipulated image to the captured image. Alternatively the scaling may be inherent to the mapping process.

When the digital image of the person wearing the clothing item is captured, as shown in FIG. 4, additional information may also be captured. Information about the clothing item may be captured, such as the texture of the item of clothing. Other information may be captured, such as lighting information. The lighting information may be general information about the lighting of the scenario under which the image is captured, as well as lighting information relating to shadowing associated with the wearing of the clothing item by the person.

When the image as illustrated in FIG. 8 is generated, this additional information may be utilised. Thus the image may be manipulated not only based on the mapping of the reference pixels, but also based on the captured information about the texture of the clothing garment and/or the captured information about the lighting of the scenario.

The captured image as illustrated in FIG. 6 may capture an image of the reference clothing item fitted to a model, and when a user accesses the system later in order to view an illustration of a particular pattern the pattern may be shown as displayed in combination with the image of the model. However it may be also possible for a user to provide their own image, being an image taken with them fitted with the reference item, such that catalogue items may be displayed in combination with their own image. Such an image may be provided by a user directly, or may be taken by a user on visiting a shop for example.

In the example described, the manipulated image is applied to a captured image of an object, such that the manipulated image is applied to a representation of the object which is not the actual object. In the described example the manipulated image can be considered as merged with the captured image of the object.

The display of the image as shown in FIG. 8 may be a display of the manipulated image applied to a representation of the object (a captured image) on a computer screen.

However the display may take place in other ways.

For example the manipulated image of the catalogue item may be projected onto a person wearing the reference item, and then the displayed catalogue item viewed in a mirror. In this example the representation of the object is the actual object (i.e. the person). Such an example still needs a reference image to be captured in order to correctly manipulate the catalogue image but the manipulated image is then projected onto the object rather than merged with an image of the object.

Whilst the image may be captured using a camera, and be a static image, the image may also be captured using a video camera and be a moving image. In this way an input being a moving image may be dynamically utilised in order to generate a moving image of the pattern applied to the reference object, so that the image as shown in FIG. 8 is actually a moving image.

Where the displayed image is projected onto a person, then the moving image may be projected onto a person as they move, the capturing of the image comprising capturing video movement, and then manipulating the image in real-time for display onto the person.

Displaying a manipulated digital image on the reference item fitted to the object may comprise combining the manipulated digital image with the captured image of the reference item fitted to the object. The manipulated digital image and the captured image may then be combined by digitally merging them.

When the manipulated digital image and the captured image are combined by digitally merging them, a combined image may be displayed in a virtual reality mirror. For example, a person may be positioned in front of a virtual reality mirror, and then a static or moving image of that person fitted with the reference item may be captured. A selected catalogue item is then chosen, and mapped accordingly using the above techniques, and displayed on the virtual reality mirror, so the person may view the mirror to see an image as if they were wearing the catalogue item.

When the manipulated digital image and the captured image are combined by digitally merging them, the combined image is displayed on a computer display. Thus a person may select multiple catalogue images, or more generally non-reference images, for viewing on the captured image (moving or still).

Displaying a manipulated digital image on the reference item fitted to the object may comprise projecting the manipulated digital image onto the reference item fitted to the object. Thus where a person is wearing the reference item, the manipulated image may be projected onto it directly, and the person can view the projected image in a mirror. The person can thus view the item as if they were wearing an item made based on the image template, and viewing it in the mirror.

A captured image may be stored. Displaying the manipulated digital image on the reference item fitted to the object may comprise retrieving a stored captured image and displaying the manipulated captured image on the retrieved stored captured image.

The reference item may be an item of clothing. The digital image may be a digital image of an item of clothing. The reference item may be a clothing item of a type corresponding to the type of clothing item of the digital image. For example, a three-part clothing item image may be mapped to a reference item which is made for three parts. In this respect, the number of parts refers to the number of different materials which may make up the item, for example for a knitted item of clothing, three knitted threads.

The reference item may be made from two distinct materials such that the two different materials are visibly distinct on a captured image of the reference item. The reference item may be made from materials of distinct colours. The reference item may be made from materials having distinct ultra-violet properties, not being distinct to the naked eye.

The captured image may or may not be re-touched before coining with the displayed image.

Figure 10:
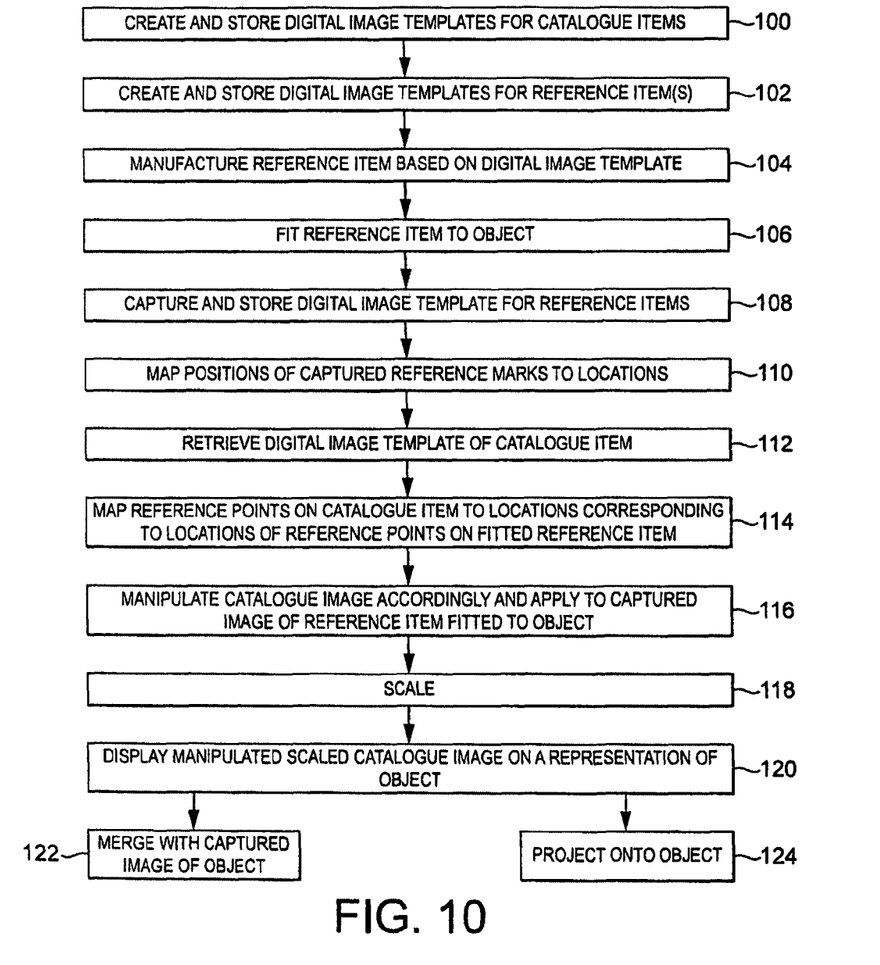
FIG. 10 illustrates an exemplary process flow.

With reference to FIG. 10, there is now further described example implementations in accordance with the invention. In a step 100 there is created and stored digital image templates for catalogue items. In general, the image templates are for non-reference items.

In a step 102 there is created and stored digital image templates for reference items.

In a step 104 a reference item is manufactured according to the digital template for the reference item.

In a step 106 the manufactured reference item is fitted to an object.

In a step 108 a digital image of the reference item fitted to the object is captured and stored.

In a step 110 positions of the captured reference marks on the reference item—fitted to the object—are mapped to locations.

In a step 112 a digital image template of a catalogue item is retrieved.

In a step 114 reference points on the catalogue item are mapped to locations corresponding to locations of reference points on the fitted reference item (from the captured image).

In a step 116 the digital template of the catalogue image is used to manipulate the catalogue image and apply the captured image of the reference item fitted to the object.

In step 118 the mapping is scaled, if necessary. Scaling may be accounted for in the mapping. Any scaling may be applied before step 114.

In step 120, the manipulated catalogue image, if necessary appropriately scaled, is displayed on a representation of the object.

If the representation of the object is not the object itself, for example being an image of the object, then in step 122 the manipulated images merge with the captured image of the object. If the representation of the object is the object itself, then in step 124 the manipulated image is projected onto the object.

Figure 11:
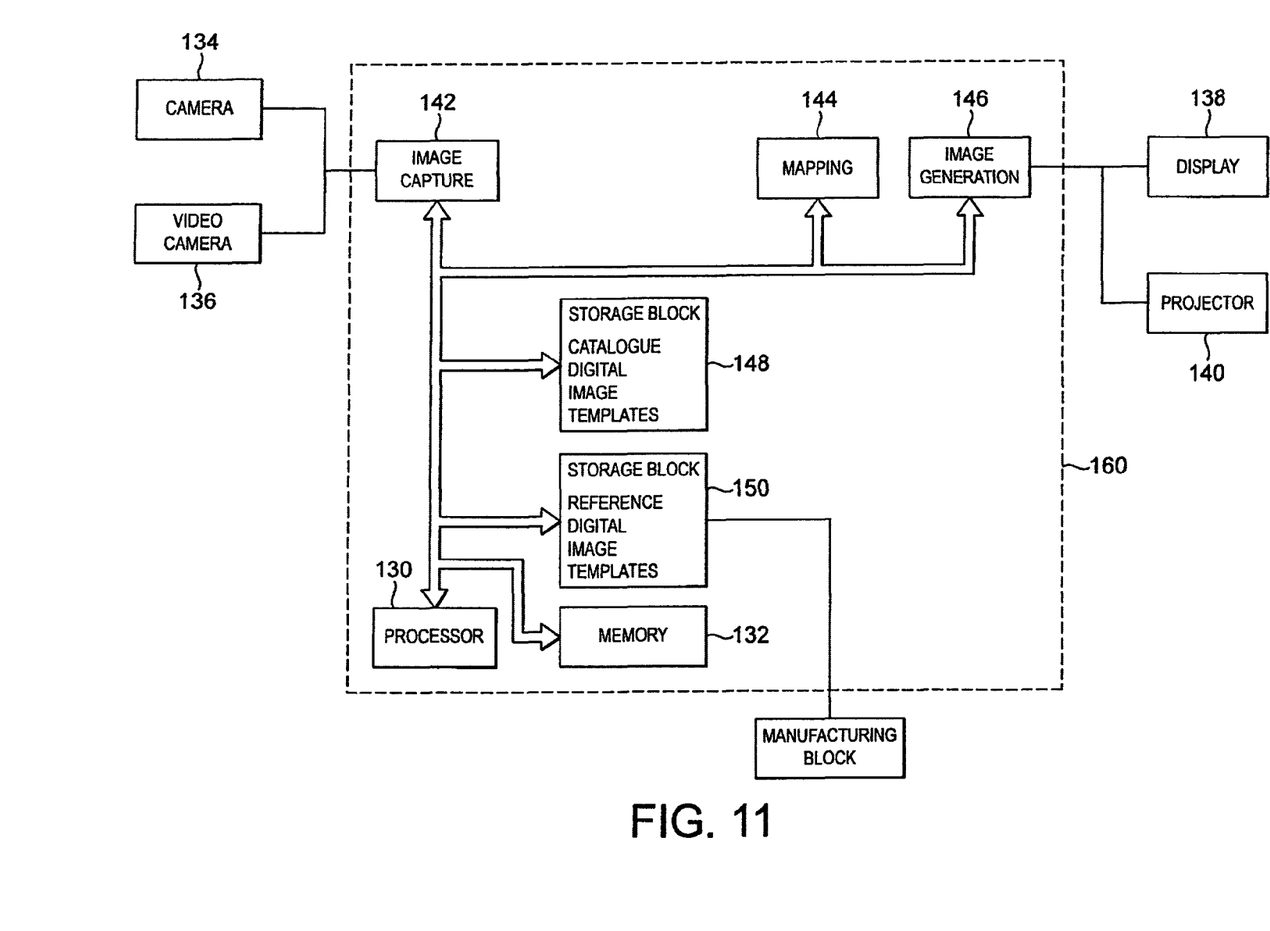
FIG. 11 illustrates an exemplary computer system architecture.

With reference to FIG. 11, there is illustrated an example architecture of a system for implementing the described techniques. The system 160 includes a processor 130 and associated memory 132, an image capture block 142, a mapping block 144, a storage block 148 for storing digital image templates of catalogue items, a storage block 150 for storing digital image templates of reference items, and an image generation block 146. All of the elements of the system are interconnected by a communication bus 154.

In addition the system 160 is connected to a camera 134 and a video camera 136, the camera 134 and the video camera 136 being connected to the image capture block 142.

In addition the system 160 is connected to a display 138, for example a display associated with a computer, and/or a projector 140. The display 138 and the projector 140 are connected to the image generation block 146.

In addition the system 160 is connected to a manufacturing block 152. The manufacturing block 152 may be connected to the storage digital image template reference items of the storage block 150.

The reference image and its associated digital image are the diagrammatic colour plans of the garment, where the image is clothing item.

To the extent that the reference item is made from ultra-violet sensitive material, the ultra-violet sensitive material does not influence luminance in a way that it cannot be filtered out.

Computer vision may be used to automate the process.

Pattern recognition may be utilised to automatically identify point correspondences.

Where the item is a clothing item, pattern recognition and knowledge of the hue or material properties of the reference garment may be used to automatically mask out the non-garment areas.

Processed forms of the correspondences may be utilised so that remapping, where done, may be done efficiently on external devices Preferably the reference pattern that is used to obtain the point correspondences may be embedded into the garment itself. The reference garment may be made from the pattern including the embedded reference pattern.

An additional mapping may be utilised to map different sizes of garments to the same garment. Thus, where the item is a clothing item, the mapping may be crated for one item, and then further mappings crated for different garment sizes. This may be a derivative of scaling.

The invention has been described by way of reference to particular example scenarios, and the invention is not limited to these examples.

For example the invention is described with an example implementation where the object is a person. However the object may be any entity. The invention is also described in the context of an item of clothing being applied to the object, but in general any item may be applied to an object.

The invention is not limited to the details of any example or embodiment set out hereinabove, nor is the invention limited to the combination of any features of any example or embodiment as set out hereinabove.

The invention claimed is:

1. A method of displaying a digital image on a representation of an object, comprising:
defining reference points on a digital image template of a reference item, the digital image template representing sections of the pattern of the reference item and the reference item being an article of clothing;
manufacturing, by knitting, the article of clothing as the reference item including the reference points being knitted into the reference item based on the defined reference points on the digital image template;
fitting the manufactured article of clothing to an object;
capturing an image of the article of clothing fitted to the object;
mapping positions on a digital image template of a non-reference item to location positions of the reference points on the captured image the digital image template of the non-reference item including corresponding sections of a pattern of the non-reference item, to generate a manipulated non-reference digital image; and
displaying the manipulated non-reference digital image on the reference item fitted to the object.

2. The method of claim 1 wherein the representation of the object is the captured image of the reference item fitted to the object, and the manipulated non-reference digital image is displayed on the captured image of the reference item fitted to the object.

3. The method of claim 1 wherein the representation of the object is the object, and the manipulated non-reference digital image is projected on to the object.

4. The method of claim 1 wherein the mapping step comprises detecting the reference points on the captured image of the reference item fitted to the object and mapping the reference points to location points, wherein corresponding points on the digital image template of a catalogue item are mapped to the associated location points to manipulate the non-reference digital image for display on the representation of the object.

5. The method of claim 1 wherein the step of displaying the manipulated non-reference digital image on the reference item fitted to the object further comprises combining the manipulated non-reference digital image with the captured image of the reference item fitted to the object.

6. The method of claim 5 wherein when the manipulated non-reference digital image and the captured image of the reference item fitted to the object are combined by digitally merging them, the combined image is displayed on a computer display.

7. The method of claim 1 wherein the step of displaying the manipulated non-reference digital image on the reference item fitted to the object further comprises projecting the manipulated non-reference digital image onto the reference item fitted to the object.

8. The method of claim 1 wherein capturing the image of the reference item fitted to the object includes capturing information about the fitting of the reference item to the object.

9. The method of claim 8 wherein manipulating the non-reference digital image includes manipulating the non-reference digital image in dependence on the captured information about the fitting of the reference item to the object, wherein the captured information includes lighting information, wherein the captured information includes information of the lighting of the reference item fitted to the object and wherein the captured information comprises lighting information of the illumination of the article of clothing on the object.

10. The method of claim 1 wherein the displaying the manipulated non-reference digital image on the reference item fitted to the object comprises displaying the manipulated non-reference digital image on a static captured image.

11. The method of claim 1 wherein the object is moving and wherein the displayed image is adapted in real-time in accordance with the movement of the object.

12. The method of claim 1 comprising storing the captured image of the reference item fitted to the object.

13. The method of claim 12 wherein displaying the manipulated non-reference digital image on the reference item fitted to the object comprises retrieving the stored captured image of the reference item fitted to the object and displaying a manipulated captured image on the retrieved stored captured image of the reference item fitted to the object.

14. The method of claim 1 wherein the object is a person.

15. The method of claim 1 in which capturing the image of the reference item fitted to the object includes capturing information about the fitting of the reference item to the object, wherein the information includes lighting information.

16. The method of claim 1, wherein capturing the image of the reference item fitted to the object comprises capturing the image within a coordinate space defined by pixel locations within a photographic image, thereby facilitating the positioning of the sections in a space defined by the coordinate space defined by pixel location within the photographic image.

17. The method of claim 1, wherein the reference points on the digital image template are set away from and within the edges of the sections of the pattern of the reference item, thereby facilitating the positioning of the sections in alternative spaces.

18. The method of claim 1, wherein capturing the image of the reference item fitted to the object comprises capturing the image within a coordinate space defined by pixel locations within the photographic image.

19. A computer-readable medium storing executable code, which, when executed by a processor, causes the processor to:
define reference points on a digital image template of a reference item, the digital image template representing sections of the pattern of the reference item and the reference item being an article of clothing;
manufacture, by knitting, the article of clothing as the reference item including the reference points being knitted into the reference item based on the defined reference points on the digital image template;
fit the reference item to an object;
capture an image of the reference item fitted to the object;
map positions on a digital image template of a non-reference item to location positions of the reference points on the captured image the digital image template of the non-reference item including corresponding sections of a pattern of the non-reference item, to generate a manipulated non-reference digital image; and
display the manipulated non-reference digital image on the reference item fitted to the object.

20. The medium of claim 19 wherein a representation of the object is the captured image of the reference item fitted to the object, and wherein the executable code, when executed, causes the processor to display the manipulated non-reference digital image on the captured image of the reference item fitted to the object.

21. The medium of claim 19 wherein a representation of the object is the object, and wherein the executable code, when executed, causes the processor to project the manipulated non-reference digital image on to the object.

22. The medium of claim 19 wherein, to map said positions, the executable code causes the processor to detect the reference points on the captured image of the reference item fitted to the object and map the reference points to location points, wherein corresponding points on the digital image template of a catalogue item are mapped to the associated location points to manipulate the non-reference digital image for display on a representation of the object.

* * * * *